United States Patent
Barton et al.

(10) Patent No.: US 7,452,168 B2
(45) Date of Patent: *Nov. 18, 2008

(54) CHUCK

(75) Inventors: Christopher B. Barton, Seneca, SC (US); Stephen W. Steadings, Seneca, SC (US)

(73) Assignee: Jacobs Chuck Manufacturing Company, Clemson, SC (US)

( * ) Notice: Subject to any disclaimer, the term of this patent is extended or adjusted under 35 U.S.C. 154(b) by 307 days.

This patent is subject to a terminal disclaimer.

(21) Appl. No.: 11/343,888

(22) Filed: Jan. 31, 2006

(65) Prior Publication Data

US 2006/0119051 A1 Jun. 8, 2006

Related U.S. Application Data

(63) Continuation of application No. 10/822,514, filed on Apr. 12, 2004, now Pat. No. 7,018,146, which is a continuation of application No. 10/355,774, filed on Jan. 31, 2003, now Pat. No. 6,736,410, which is a continuation of application No. 10/074,290, filed on Feb. 12, 2002, now Pat. No. 6,536,781, which is a continuation of application No. 09/907,266, filed on Jul. 17, 2001, now Pat. No. 6,367,815, which is a continuation of application No. 09/443,629, filed on Nov. 19, 1999, now Pat. No. 6,279,918, which is a continuation of application No. 08/903,679, filed on Jul. 31, 1997, now Pat. No. 6,068,266, which is a continuation of application No. 08/472,181, filed on Jun. 7, 1995, now Pat. No. 5,709,392, which is a continuation of application No. 08/289,922, filed on Aug. 12, 1994, now Pat. No. 5,501,473, which is a continuation-in-part of application No. 08/106,063, filed on Aug. 13, 1993, now Pat. No. 5,348,317.

(51) Int. Cl.
 *B23B 31/12* (2006.01)

(52) U.S. Cl. .................................. 408/240; 279/62
(58) Field of Classification Search ................ 408/240; 279/60, 61, 62, 64, 125, 157, 902
See application file for complete search history.

(56) References Cited

U.S. PATENT DOCUMENTS 573,189 A 12/1896 Vogel ......................... 279/62

(Continued)

FOREIGN PATENT DOCUMENTS

DE 3512130 10/1986 ...................... 31/4

(Continued)

OTHER PUBLICATIONS

Yukiwa "Products" Brochure, 1993.
Bosch Catalog No. 890,021, Sep. 1990, pp. 15 and 17.

*Primary Examiner*—Daniel W Howell
(74) *Attorney, Agent, or Firm*—Nelson Mullins Riley & Scarborough, LLP

(57) ABSTRACT

A chuck for use with a manual or powered driver including a generally cylindrical body having a nose section and a tail section. The tail section defines an axial bore formed therein to mate with the drive shaft of the driver and the nose section defines an axial bore formed therein and a plurality of angularly disposed passageways formed therethrough and intersecting the axial bore. A plurality of jaws is slidably positioned in each passageway and each jaw defines a jaw face formed on one side and threads formed on the opposite side. A nut is disposed about the body for rotational movement with respect to the body and is in driving engagement with the jaw threads. A generally cylindrical front sleeve overlays the nose section of the body. A generally cylindrical nut retainer is disposed about the body and includes a frusto-conical portion.

11 Claims, 4 Drawing Sheets

U.S. PATENT DOCUMENTS

| | | |
|---|---|---|
| 897,335 A | 9/1908 | Almond |
| 911,012 A | 1/1909 | Jacobs |
| 1,123,541 A | 1/1915 | Jacobs |
| 1,338,775 A | 5/1920 | Hubbell ............... 279/62 |
| 1,417,981 A | 5/1922 | Englund |
| 1,526,328 A | 2/1925 | Englund |
| 2,292,470 A | 8/1942 | Ostberg |
| 2,347,483 A | 4/1944 | Katcher |
| 2,395,228 A | 2/1946 | Lininger ............... 219/144 |
| 2,684,856 A | 7/1954 | Stoner |
| 3,589,486 A | 6/1971 | Kelch |
| 3,807,745 A | 4/1974 | Bent |
| 3,813,827 A | 6/1974 | Bloch |
| 3,927,892 A | 12/1975 | Pradota |
| 4,252,333 A | 2/1981 | Vogel |
| 4,275,893 A | 6/1981 | Bilanceri |
| 4,305,597 A | 12/1981 | McCarty |
| 4,381,116 A | 4/1983 | Futter |
| 4,395,170 A | 7/1983 | Clarey |
| 4,423,881 A | 1/1984 | Whitehead |
| 4,460,296 A | 7/1984 | Sivertson, Jr. |
| 4,575,108 A | 3/1986 | Whitehead |
| 4,627,627 A | 12/1986 | Rohm ............... 279/19.3 |
| 4,648,608 A | 3/1987 | Smith |
| 4,660,841 A | 4/1987 | Chouinard |
| 4,664,394 A | 5/1987 | Theissig et al. |
| 4,682,918 A | 7/1987 | Palm |
| 4,695,065 A | 9/1987 | Komatsu et al. |
| 4,695,066 A | 9/1987 | Rohm ............... 279/62 |
| 4,702,122 A | 10/1987 | Richard |
| 4,817,971 A | 4/1989 | Flynn |
| 4,840,387 A | 6/1989 | McCarthy |
| 4,842,288 A | 6/1989 | Ando |
| 4,951,955 A | 8/1990 | Sakamaki |
| 4,991,860 A | 2/1991 | Rohm ............... 279/62 |
| 5,009,439 A | 4/1991 | Sakamaki |
| 5,125,673 A | 6/1992 | Huff et al. |
| 5,135,241 A | 8/1992 | Huff et al. ............... 279/142 |
| 5,145,192 A | 9/1992 | Rohm |
| 5,145,193 A | 9/1992 | Rohm |
| 5,174,588 A | 12/1992 | Reibetanz et al. ............... 279/62 |
| 5,183,274 A | 2/1993 | Sakamaki |
| 5,193,824 A | 3/1993 | Salpaka |
| 5,215,317 A | 6/1993 | Jordan et al. |
| 5,234,223 A | 8/1993 | Sakamaki |
| 5,253,879 A | 10/1993 | Huff et al. |
| 5,299,814 A | 4/1994 | Salpaka ............... 279/157 |
| 5,348,317 A | 9/1994 | Steadings et al. |
| 5,348,318 A | 9/1994 | Steadings et al. |
| 5,367,815 A | 11/1994 | Liou |
| 5,390,940 A | 2/1995 | Morlino et al. |
| 5,409,243 A | 4/1995 | Shadeck et al. |
| 5,411,275 A | 5/1995 | Huff et al. |
| 5,458,345 A | 10/1995 | Amyot |
| 5,465,983 A | 11/1995 | Owens et al. |
| 5,466,983 A | 11/1995 | Shirai et al. |
| 5,476,273 A | 12/1995 | Shadeck et al. |
| 5,501,473 A | 3/1996 | Barton et al. |
| 5,709,392 A | 1/1998 | Barton et al. |
| 5,716,057 A | 2/1998 | Wright, Jr. et al. |
| 5,816,583 A | 10/1998 | Middleton |
| 5,829,762 A | 11/1998 | Claramunt et al. |
| 5,913,524 A | 6/1999 | Barton |
| 5,944,328 A | 8/1999 | Lin et al. |
| 5,957,469 A | 9/1999 | Miles et al. |
| 5,984,320 A | 11/1999 | Nakamura |
| 6,007,071 A | 12/1999 | Middleton |
| 6,068,266 A | 5/2000 | Barton et al. |
| 6,073,939 A | 6/2000 | Steadings et al. |
| 6,279,918 B1 | 8/2001 | Barton et al. |
| 6,367,815 B2 | 4/2002 | Barton et al. |
| 6,536,781 B2 | 3/2003 | Barton et al. |
| 6,736,410 B2 * | 5/2004 | Barton et al. ............... 279/62 |
| 7,018,146 B2 * | 3/2006 | Barton et al. ............... 408/240 |

FOREIGN PATENT DOCUMENTS

| | | | |
|---|---|---|---|
| DE | 4023303 C1 | 9/1991 | |
| DE | 38 74 885 T2 | 3/1993 | |
| DE | 42 38 461 C1 | 2/1994 | |
| EP | 0059030 | 9/1982 | ............... 31/12 |
| EP | 0 340 310 | 11/1989 | |
| EP | 0 433 187 | 8/1995 | |
| FR | 2606691 | 11/1986 | |
| GB | 661643 | 11/1951 | |
| GB | 1330065 | 9/1973 | |
| GB | 1565048 | 4/1980 | |
| GM | 34 39 668 | 4/1986 | |
| GM | 40 23 304 | 9/1991 | |
| JP | 63-216604 | 9/1988 | |
| JP | 5-38608 | 2/1993 | |
| JP | 11-165204 | 6/1999 | ............... 31/12 |
| WO | WO-89/03267 | 4/1989 | |
| WO | 90-11860 | 10/1990 | ............... 31/12 |
| WO | WO 90/11860 | 10/1990 | |

* cited by examiner

CHUCK

CLAIM OF PRIORITY

This is a continuation of application Ser. No. 10/822,514, filed Apr. 12, 2004, now U.S. Pat. No. 7,018,146, which is a continuation of application Ser. No. 10/355,774, filed Jan. 31, 2003, now U.S. Pat. No. 6,736,410, which is a continuation of application Ser. No. 10/074,290, filed Feb. 12, 2002, now U.S. Pat. No. 6,536,781, which is a continuation of application Ser. No. 09/907,266, filed Jul. 17, 2001, now U.S. Pat. No. 6,367,815, which is a continuation of application Ser. No. 09/443,629, filed Nov. 19, 1999, now U.S. Pat. No. 6,279,918, which is a continuation of continued prosecution application Ser. No. 08/903,679, filed Jul. 31, 1997, now U.S. Pat. No. 6,068,266, which is a continuation of application Ser. No. 08/472,181, filed Jun. 7, 1995, now U.S. Pat. No. 5,709,392, which is a continuation of application Ser. No. 08/289,922, filed Aug. 12, 1994, now U.S. Pat. No. 5,501,473, which is a continuation-in-part of application Ser. No. 08/106,063, filed Aug. 13, 1993, now U.S. Pat. No. 5,348,317 the entire disclosures of which are hereby incorporated by reference herein.

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft and configured so that rotation of the body in one direction relative to a constrained nut engaging the jaws forces the jaws into gripping relationship with respect to the cylindrical shank of a tool, while rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck" commonly assigned to the present assignee, and whose entire disclosure is incorporated by reference herein.

Despite the success of keyless chucks such as set forth in U.S. Pat. No. 5,125,673, varying configurations of chucks are desirable for a variety of applications. Currently utilized in a variety of chuck applications are ball bearings for reducing friction between the nut and body from axial thrust of the nut onto the body. These bearings are sometimes caged and have separate top and bottom thrust races. Sometimes the body or the nut, if hard enough, can serve as the bottom or top thrust race, respectively. It would be desirable to have a keyless chuck that requires fewer components or lower manufacturing or assembly cost. In addition, it would be desirable to have a chuck configuration whereby radial as well as axial thread stresses were minimized when the chuck was operated. Further, it would be desirable to have a chuck whereby the front sleeve is maintained in place by a nosepiece that is both functional and serves an aesthetic purpose.

SUMMARY OF THE INVENTION

The present invention recognizes and addresses the foregoing considerations, and others of prior art constructions and methods.

Accordingly, it is an object of the present invention to provide an improved chuck. It is another object of the present invention to provide a chuck that minimizes radial as well as axial stress during operation. It is another object of the present invention to provide a keyless chuck that has a minimum number of individual components that must be assembled. It is another object of the present invention to provide a chuck with an improved nosepiece that is both decorative and retains the front sleeve in place.

Yet another object of the present invention is to provide an improved mechanism for maintaining a one-piece nut on the body of a chuck.

These and other objects are achieved by providing a chuck for use with a manual or power driver having a rotatable drive shaft, the chuck comprising a generally cylindrical body member having a nose section and a tail section. The tail section has an axial bore formed therein to mate with the drive shaft of the driver, and the nose section has an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof and threads formed on the opposite side thereof. The chuck further includes a nut rotatably mounted on the body and in engagement with the threads of the jaws and a bearing thrust ring fixed on the body member. The chuck further includes a self-contained anti-friction bearing assembly disposed between the nut and the thrust ring and a generally cylindrical front sleeve member in driving engagement with the nut and overlying the nose section of the body member whereby when the front sleeve member is rotated with respect to the body member, the jaws will be moved thereby.

These and other objects are also accomplished by providing a chuck for use with a manual or power driver having a rotatable drive shaft, the chuck comprising a generally cylindrical body member having a nose section and a tail section, the tail section having an axial bore formed therein to mate with the drive shaft of the driver, and the nose section having an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof and threads formed on the opposite side thereof. The chuck further includes a nut rotatably mounted on the body and in engagement with the threads on the jaws, and a generally cylindrical front sleeve member overlying the nose section of the body member and in driving engagement with the nut. The chuck further includes a rust-resistant nosepiece adapted to be secured to the nose section of the body, the nosepiece maintaining the front sleeve member in driving engagement with the nut, whereby when said front sleeve member is rotated with respect to the body member, the jaws will be moved thereby.

These and other objects are further accomplished by providing a chuck for use with a manual or powered driver having a rotatable drive shaft, the chuck comprising a generally cylindrical body member having a nose section and a tail section. The tail section is adapted to mate with the drive shaft of the driver and the nose section having an axial bore formed therein and a plurality of angularly disposed passageways formed therethrough and intersecting said axial bore. The chuck further includes a plurality of jaws slidably positioned in the angularly disposed passageways, each of the jaws having a jaw face formed on one side thereof. The chuck further including a nut rotatably mounted on the body member and in engagement with the threads on the jaws. The chuck further includes a nut retainer member received on the body for maintaining the nut on the body, the nut retainer member including a frusto-conical portion. The chuck further includes a generally cylindrical front sleeve member in driving engagement with the nut and overlying the nose section of the body member whereby when the front sleeve member is rotated with respect to the body member, the jaws will be moved thereby. In a preferred embodiment, the nut retainer member further includes a cylindrical portion which is press fitted onto the body member.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
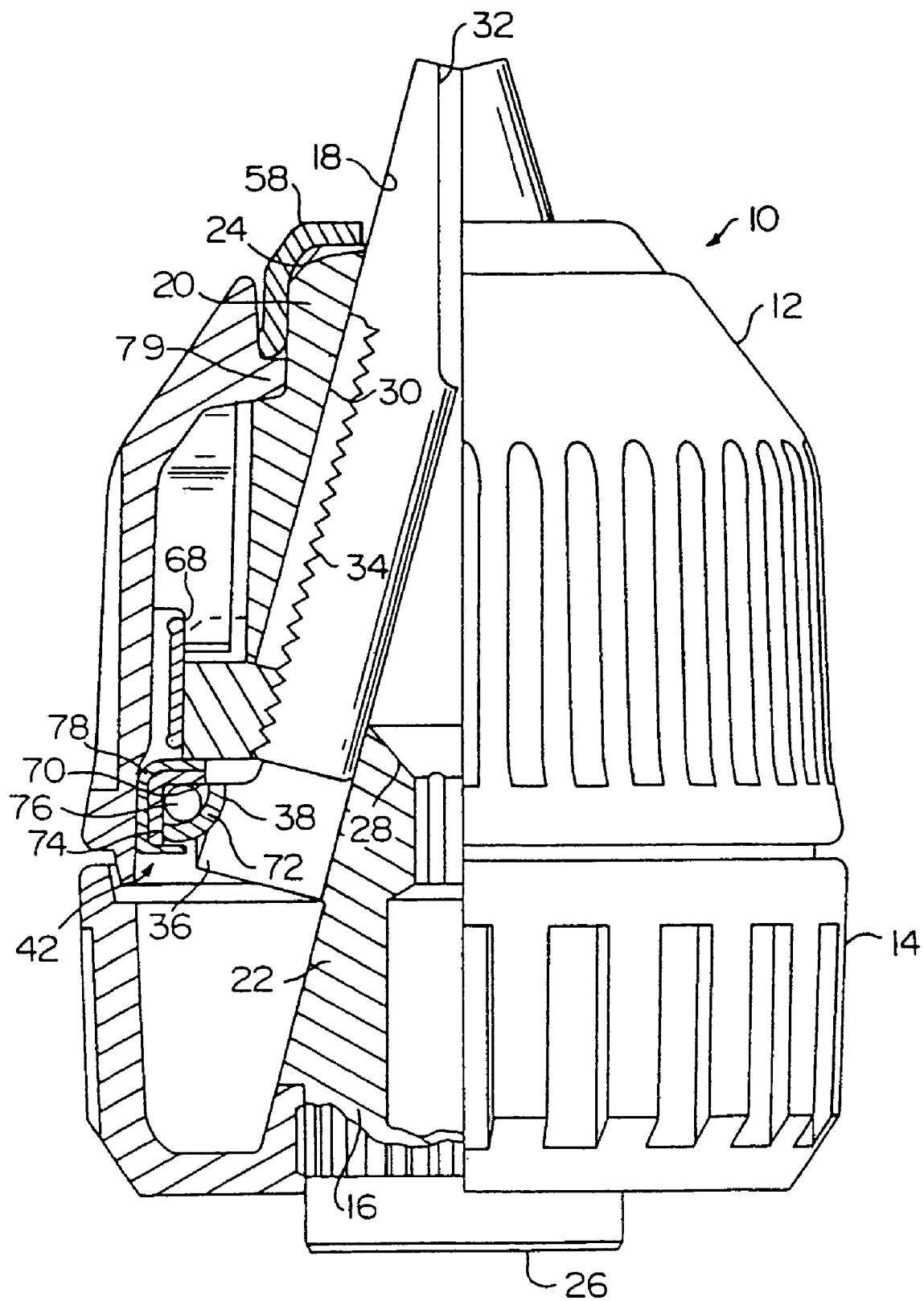
FIG. 1 is a longitudinal view, partly in section, of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the-art that the present discussion is a description of exemplary embodiments only, and is not intended as limiting the broader aspects of the present invention, which broader aspects are embodied in the exemplary construction.

Figure 2:
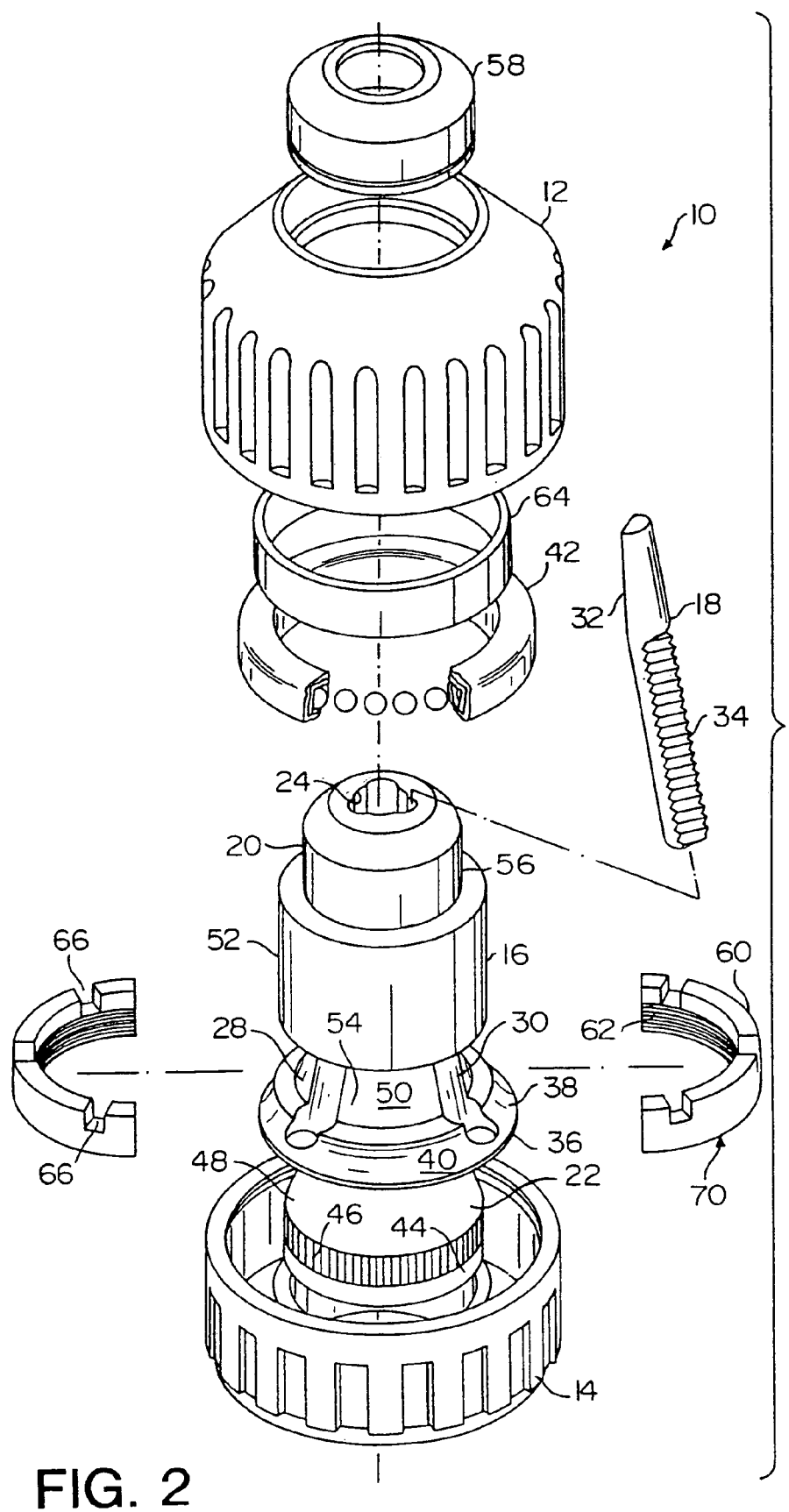
FIG. 2 is an exploded view of the chuck illustrated in FIG. 1.

Referring to FIGS. 1 and 2, a chuck 10 in accordance with the present invention is illustrated. Chuck 10 includes a front sleeve member 12, an optional rear sleeve member 14, a body member 16 and jaws 18. Body member 16 is generally cylindrical in shape and comprises a nose or forward section 20 and a tail or rearward section 22. An axial bore 24 is formed in the nose section 20 of the body member 16. Axial bore 24 is somewhat larger than the largest tool shank that the chuck is designed to accommodate. A threaded bore 26 is formed in tail section 22 of body 16 and is of a standard size to mate with the drive shaft of a powered or hand driver (not shown). The bores 24, 26 may communicate at the central region 28 of body member 16. While a threaded bore 26 is illustrated, such bore could be replaced with a tapered bore of a standard size to mate with a tapered drive shaft.

Passageways 30 are formed in body member 16 to accommodate each jaw 18. Preferably, three jaws 18 are employed and each jaw 18 is separated from the adjacent jaw by an arc of approximately 120 degrees. The axes of the passageways 30 and the jaws 18 are angled with respect to the chuck axis but intersect the chuck axis at a common point ahead of the chuck body 16. Each jaw 18 has a tool engaging face 32 which is generally parallel to the axis of the chuck body 16 and threads 34 on its opposite or outer surface. Threads 34 of any suitable type and pitch may be utilized within the scope of the present invention as would be readily apparent to one skilled in the art.

As illustrated in FIGS. 1 and 2, body member 16 includes a thrust ring member 36 which, in a preferred embodiment, is integral therewith. Thrust ring member 36 includes a thrust face 38. Thrust face 38 includes an arcuate seating surface 40 for engagement with the inner race of a self-contained anti-friction bearing assembly 42 as will be described in more detail below. Thrust ring member 36 includes a plurality of jaw guideways 30 formed around the circumference to permit retraction of the jaws 18 therethrough.

Body member 16 includes a rear cylindrical portion 44 with a knurled surface 46 thereon for receipt of optional rear sleeve 14 to be pressed thereon if so desired. Body 16 further includes a first tapered portion 48 extending from rear cylindrical portion 44 to thrust ring 36. A second tapered portion 50 extends from the area of thrust face 38 to a front cylindrical portion 52. Front cylindrical portion 52 is of greater diameter than the smaller end of second tapered portion 50 and forms a first circumferential groove 54 intermediate the nose and tail sections 20 and 22 of body 16. Body 16 further includes a reduced diameter nose portion 56 that is adapted to receive a nosepiece 58 as will be described in more detail below.

The present invention further includes a nut 60 which, in a preferred embodiment, is a split nut and which includes threads 62 for mating with threads 34 on jaws 18 whereby when said nut is rotated with respect to said body, said jaws will be advanced or retracted. Nut 60 is adapted to receive a retaining band 64 for maintaining nut 60 together after it is assembled. In the illustrated embodiment, a split nut is utilized because of the diameter of front cylindrical portion 52. Nut 60 includes drive slots 66 for mating with drive ribs 68 on front sleeve 12 so that when front sleeve 12 is rotated, nut 60 will rotate therewith and move jaws 18 as set forth above.

A self-contained bearing assembly 42 is adapted to be placed between thrust ring 36 and a face 70 of nut 60. Self-contained bearing assembly 42 includes an inner race 72, an outer race 74 and bearing elements 76 maintained therebetween. In a preferred embodiment, bearing elements 76 are ball bearings. Self-contained bearing assembly 42 may further include a shroud 78 surrounding the inner and outer races 72, 74 for maintaining the bearing assembly as a self-contained component. Inner race 72 includes an arcuate surface that is dimensioned and configured to mate with arcuate seating surface 40 on thrust face 38 of thrust ring 36. Such mating relationship assists in alignment and minimization of both axial and radial stresses when the chuck is operated. In a preferred embodiment, self-contained bearing assembly 42 is a radial thrust bearing.

Use of a self-contained bearing assembly has a number of advantages. Assembly is greatly simplified in that individual ball bearings and cages do not have to be handled. In addition, the body and nut are not required to be as hard or dense as is necessary with conventional bearing systems where the body or nut may also serve as a thrust race, thus allowing more flexibility in materials and reducing secondary manufacturing operations and, ultimately, cost.

Front sleeve member 12 is adapted to be loosely fitted over nose section 20 of chuck 10. Drive ribs 68 of front sleeve 12 engage drive slots 66 of nut 60 so that front sleeve 12 and nut 60 will be operatively connected, i.e., when front sleeve 12 is rotated, nut 60 will rotate therewith. Front sleeve 12 includes an annular ledge portion 79 adapted to rest at the inner face of front cylindrical portion 52 and nose portion 56. Nosepiece 58 is dimensioned and adapted to be pressed onto nose portion 56 to maintain front sleeve 12 on chuck 10. It should be appreciated that nosepiece 58 could also be secured by snap fit, threading or the like. Nosepiece 58 is exposed when said chuck is assembled and is preferably coated with a non-ferrous metallic coating to prevent rust and to enhance its appearance. In a preferred embodiment, such coating may be zinc or nickel, however, it should be appreciated that any suitable coating could be utilized.

Nosepiece 58 serves to maintain front sleeve member 12 in position on chuck 10 and in driving engagement with nut 60. In addition, nosepiece 58 serves the dual purpose of providing an aesthetically pleasing cover for nose portion 56 that inhibits rust. This provides the advantage of an aesthetically pleasing appearance without the necessity to coat the entire body member 16 with a non-ferrous material. If desired, the rear sleeve member 14 may be omitted and the front sleeve member 12 extended to the tail end of body 16. This alternative is feasible when a spindle lock or the like is provided on the driver or when the driver is used to tighten or loosen the jaws.

The circumferential surface of the front sleeve member 12 may be knurled or may be provided with longitudinal ribs or other protrusions to enable the operator to grip it securely. In like manner, the circumferential surface of the rear sleeve member 14, if employed, may be knurled or ribbed if desired. The front and rear sleeves may be fabricated from a structural plastic such as polycarbonate, a filled polypropylene, for example, glass filled polypropylene, or a blend of structural plastic materials. Other composite materials such as, for example, graphite filled polymerics would also be suitable in certain environments. As will be appreciated by one skilled in the art, the materials from which the chuck of the present invention is fabricated will depend on the end use of the chuck, and the above are provided by way of example only.

It will be appreciated that rear sleeve member 14 is fixed to body member 16 while front sleeve member 12 is operatively associated with nut 60 and secured to body member 16 for relative rotation therewith. Relative movement of the front and rear sleeve members, 12 and 14, due to the interaction between threads 34 on jaws 18 and threads 62 on nut 60 causes jaws 18 to be advanced or retracted, depending upon the direction of relative movement.

Figure 3:
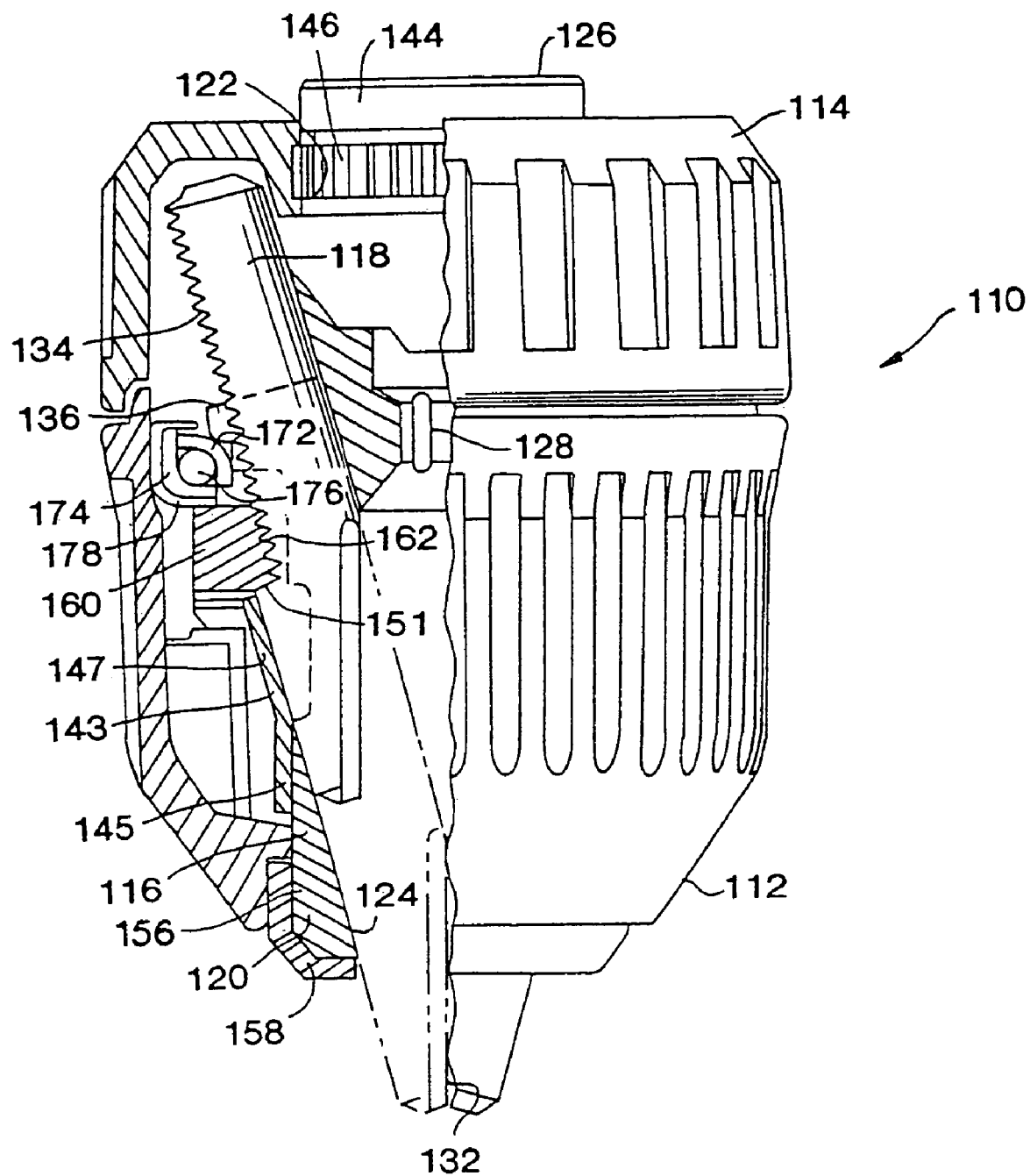
FIG. 3 is a longitudinal view, partly in cross-section of another embodiment in accordance with the present invention.
Figure 4:
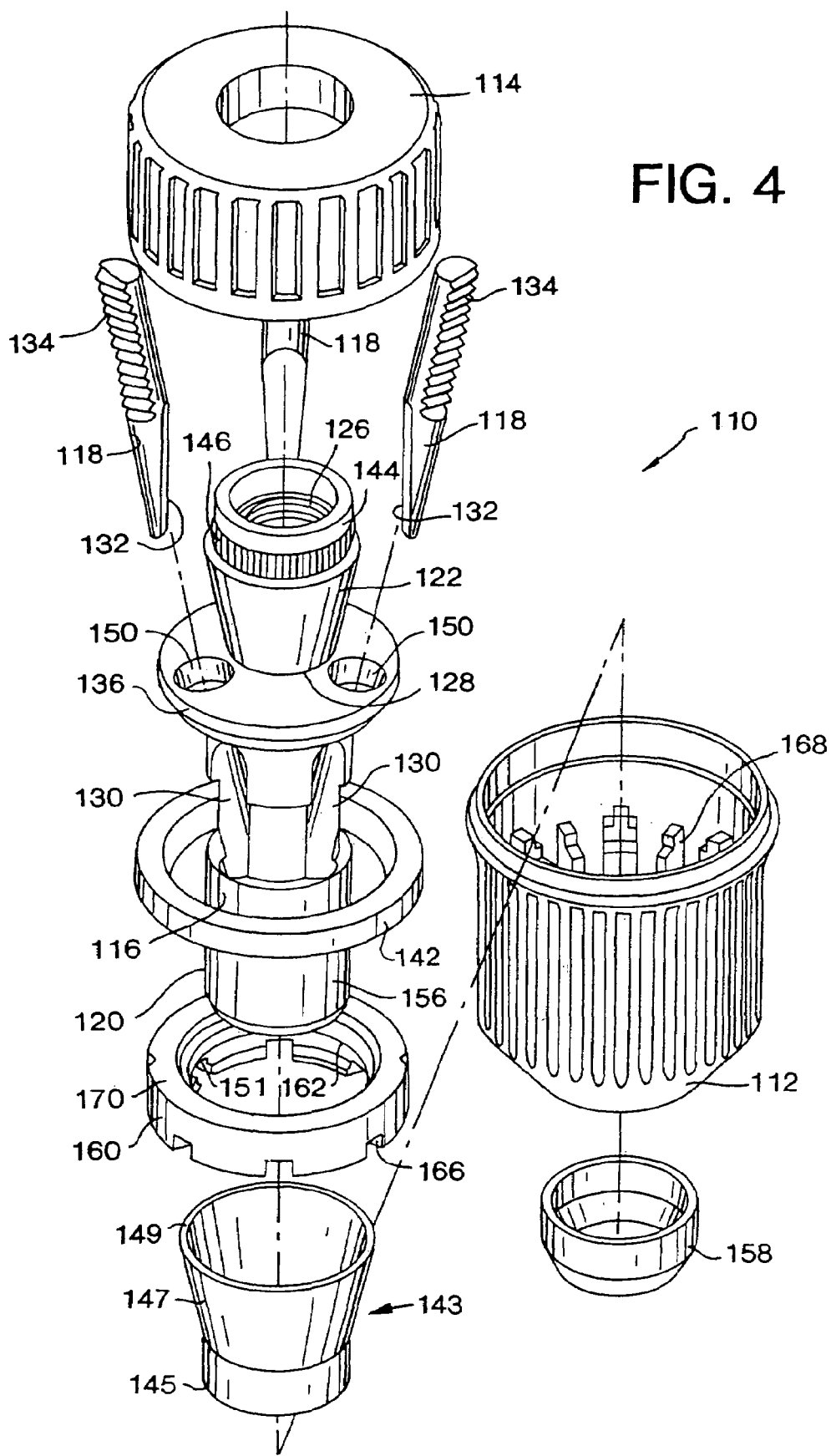
FIG. 4 is an exploded view of the chuck illustrated in FIG. 3.

Referring to FIGS. 3 and 4, a chuck 110 in accordance with another embodiment of the present invention is illustrated. Chuck 110 includes a front sleeve member 112, an optional rear sleeve member 114, a body member 116 and jaws 118. Body member 116 is generally cylindrical in shape and comprises a nose or forward section 120 and a tail or rearward section 122. An axial bore 124 is formed in the nose section 120 of the body member 116. Axial bore 124 is somewhat larger than the largest tool shank that the chuck is designed to accommodate. A threaded bore 126 is formed in tail section 122 of body 116 and is of a standard size to mate with the drive shaft of a powered or hand driver (not shown). The bores 124, 126 may communicate at the central region 128 of body member 116. While a threaded bore 126 is illustrated, such bore could be replaced with a tapered bore of a standard size to mate with a tapered drive shaft.

Passageways 130 are formed in body member 116 to accommodate each jaw 118. Preferably, three jaws 118 are employed and each jaw 118 is separated from the adjacent jaw by an arc of approximately 120 degrees. The axes of the passageways 130 and the jaws 118 are angled with respect to the chuck axis but intersect the chuck axis at a common point ahead of the chuck body 116. Each jaw 118 has a tool engaging face 132 which is generally parallel to the axis of the chuck body 116 and threads 134 on its opposite or outer surface. Threads 134 of any suitable type and pitch may be utilized within the scope of the present invention as would be readily apparent to one skilled in the art.

As illustrated in FIGS. 3 and 4, body member 116 includes a thrust ring member 136 which, in a preferred embodiment, is integral therewith. Thrust ring member 136 includes a plurality of jaw guideways 150 formed around the circumference to permit retraction of the jaws 118 therethrough. Thrust ring member 136 may have an arcuate seating surface for receipt of a self-contained bearing assembly as described in the above embodiment.

Body member 116 includes a rear cylindrical portion 144 with a knurled surface 146 thereon for receipt of optional rear sleeve 114 to be pressed thereon if so desired.

The present invention further includes a nut 160 which, in a preferred embodiment, is a unitary nut and which includes threads 162 for mating with threads 134 on jaws 118 whereby when said nut is rotated with respect to said body, said jaws will be advanced or retracted. As illustrated in FIG. 4, nut 160 includes drive slots 166 for mating with drive ribs 168 on front sleeve 112 so that when front sleeve 112 is rotated, nut 160 will rotate therewith and move jaws 118 as set forth above.

A self-contained bearing assembly 142 is adapted to be placed between thrust ring 136 and a face 170 of nut 160. Self-contained bearing assembly 142 includes an inner race 172, an outer race 174 and bearing elements 176 maintained therebetween. In a preferred embodiment, bearing elements 176 are ball bearings. Self-contained bearing assembly 142 may further include a shroud 178 surrounding the inner and outer races 172, 174 for maintaining the bearing assembly as a self-contained component. Inner race 172 may include an arcuate surface that is dimensioned and configured to mate with an arcuate seating surface on the thrust face of thrust ring 136 such as illustrated in the previous embodiment, if so desired. Such mating relationship assists in alignment and minimization of both axial and radial friction when the chuck is operated. In a preferred embodiment, self-contained bearing assembly 142 is a radial thrust bearing. It should be appreciated that any type bearing arrangement including plain bearing surfaces could be utilized in the present invention.

Referring again to FIGS. 3 and 4, a nut retainer member is generally illustrated at 143. Nut retainer member 143 includes a first generally cylindrical portion 145 and a second frusto-conical portion 147. Substantially cylindrical portion 145 is configured to be press fitted over nose or forward section 120 in a location so that a portion 149 will engage nut 160 to prevent nut 160 from moving axially forward more than a desired amount. This desired amount can be determined by the location in which the nut retainer member is pressed onto the body member. It should be appreciated that the nut retainer member 143 is adapted to be press fitted onto the nose portion of the body, but could be secured in any other suitable manner in accordance with the present invention. Nut member 160 defines a ledge 151 and nut retainer member 143, through its portion 149, is adapted to be received on ledge 151 when contact is made between nut 160 and nut retainer member 143.

Front sleeve member 112 is adapted to be loosely fitted over nose section 120 of chuck 110. Drive ribs 168 of front sleeve 112 engage drive slots 166 of nut 160 so that front sleeve 112 and nut 160 will be operatively rotationally connected, i.e., when front sleeve 112 is rotated, nut 160 will rotate therewith.

A nosepiece 158 is dimensioned and adapted to be pressed onto the front of the forward section 12Q of body member 116 to maintain front sleeve 112 on chuck 110. It should be appreciated that nosepiece 158 could also be secured by snap fit, threading or the like. Nosepiece 158 is exposed when the chuck is assembled and is preferably coated with a non-ferrous metallic coating to prevent rust and to enhance its appearance. In a preferred embodiment, such coating may be zinc or nickel, however, it should be appreciated that any suitable coating could be utilized.

Nosepiece 158 serves to maintain front sleeve member 112 in position on chuck 110 and in driving engagement with nut 160. In addition, nosepiece 158 serves the dual purpose of providing an aesthetically pleasing cover for nose portion 156 that inhibits rust. This provides the advantage of an aesthetically pleasing appearance without the necessity to coat the entire body member 116 with a non-ferrous material. If desired, the rear sleeve member 114 may be omitted and the front sleeve member 112 extended to the tail end of body 116. This alternative is feasible when a spindle lock or the like is provided on the driver or when the driver is used to tighten or loosen the jaws.

It should also be appreciated that a snap ring or any other mechanism could be utilized to maintain front sleeve 112 in place in lieu of nosepiece 158.

The circumferential surface of the front sleeve member 112 may be knurled or may be provided with longitudinal ribs or other protrusions to enable the operator to grip it securely. In like manner, the circumferential surface of the rear sleeve member 114, if employed, may be knurled or ribbed if desired. The front and rear sleeves may be fabricated from a structural plastic such as polycarbonate, a filled polypropylene, for example, glass filled polypropylene, or a blend of structural plastic materials. Other composite materials such as, for example, graphite filled polymerics would also be suitable in certain environments. As will be appreciated by one skilled in the art, the materials from which the chuck of the present invention is fabricated will depend on the end use of the chuck, and the above are provided by way of example only.

It will be appreciated that rear sleeve member 114 is fixed to body member 116 while front sleeve member 112 is operatively associated with nut 160 and secured to body member 116 for relative rotation therewith. Relative movement of the front and rear sleeve members, 112 and 114, due to the interaction between threads 134 on jaws 118 and threads 162 on nut 160 causes jaws 118 to be advanced or retracted, depending upon the direction of relative movement.

While the above description is set forth with respect to a keyless chuck, it should be appreciated that the principles of the present invention may be equally applicable to a keyed chuck, and such is within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary a skill in the art will appreciate that the foregoing description is by way of example only, and is not intended to be limitative of the invention so further described in such appended claims.

What is claimed:

1. A chuck for use with a manual or powered driver having a rotatable drive shaft, said chuck comprising:
   a. a generally cylindrical body member having
      (i) a nose section having a first axial bore formed therein, and
      (ii) a tail section having a second axial bore formed therein, said second axial bore configured to receive the drive shaft of the driver;
   b. a plurality of jaws slidably disposed within said body in communication with said nose section axial bore;
   c. a nut disposed rotatably about but axially fixed to said body and in driving engagement with said jaws so that rotation of said nut with respect to said body drives said jaws into and out of said nose section axial bore;
   d. a bearing disposed between said body and said nut;
   e. a front sleeve member rotatably disposed about said nose section of said body, said front sleeve member having a cylindrical recess formed in a front portion thereof; and
   f. a nosepiece secured to said body nose section, said nosepiece having a generally cylindrical sidewall and an end wall extending radially inward therefrom, at least a portion of said generally cylindrical sidewall being received within said cylindrical recess of said front sleeve member so that said front sleeve member is axially fixed relative to said body.

2. The chuck as in claim 1, wherein said front sleeve member further includes an annular ledge extending radially inwardly toward said nose section of said body and said cylindrical sidewall of said nosepiece abuts said annular ledge.

3. The chuck as in claim 2, said body further comprising a front cylindrical portion disposed aft of said nose section, said front cylindrical portion having a diameter that is larger than that of said nose section such that said annular ledge of said front sleeve is rotatably received between said front cylindrical portion and said cylindrical sidewall of said nosepiece.

4. The chuck as in claim 1, wherein said nut is a split nut formed in two halves.

5. The chuck as in claim 2, wherein said split nut is received in a groove formed in said body intermediate said nose section and said tail section.

6. The chuck as in claim 2, further comprising a nut retaining member axially fixed on said body for preventing movement of said nut toward said nose section of said body member, said nut retainer member having a first portion defining a first radius and a second portion defining a second radius that is larger than said first radius.

7. The chuck as in claim 6, wherein said annular ledge is rotatably received between said cylindrical sidewall of said nosepiece and said first portion of said nut retainer member.

8. The chuck as in claim 7, wherein said nut retaining member first portion is generally cylindrical in shape.

9. The chuck as in claim 8, wherein said nut retaining member second portion is frustoconical in shape.

10. A chuck for use with a manual or powered driver having a rotatable drive shaft said chuck comprising:
   a. a generally cylindrical body member having
      (i) a nose section having a first axial bore formed therein, and
      (ii) a tail section haying a second axial bore formed therein, said second axial bore confinured to receive the drive shaft of the driver:
   b. a plurality of jaws slidably disposed within. said body in communication. with said nose section axial bore;

c. a nut disposed rotatably about but axially fixed to said body and in driving engagement with said jaws so that rotation of said nut with respect to said body drives said jaws into and out of said nose section axial bore:

d. a bearing disposed between said body and said nut, said bearing including an inner race, an outer race and bearing balls maintained therebetween;

e. a front sleeve member rotatably disposed about said nose section of said body, said front sleeve member having a cylindrical recess formed in a front portion thereof; and f. a nosepiece secured to said body nose section. said nosepiece having a generally cylindrical sidewall and an end wall extending radially inward therefrom, at least a portion of said generally cylindrical sidewall being received within said cylindrical recess of said front sleeve member so that said front sleeve member is axially fixed relative to said body.

11. The chuck as in claim 10, said bearing further including a shroud that secures said inner and out race together.

* * * * *

UNITED STATES PATENT AND TRADEMARK OFFICE
CERTIFICATE OF CORRECTION

PATENT NO. : 7,452,168 B2  Page 1 of 1
APPLICATION NO. : 11/343888
DATED : November 18, 2008
INVENTOR(S) : Christopher B. Barton and Stephen W. Steadings It is certified that error appears in the above-identified patent and that said Letters Patent is hereby corrected as shown below:

Column 7, line 8, please delete "12Q" and replace with --120--.

Signed and Sealed this

Twenty-seventh Day of January, 2009

JOHN DOLL
*Acting Director of the United States Patent and Trademark Office*